United States Patent [19]

Gellekink

[11] Patent Number: 4,743,907
[45] Date of Patent: May 10, 1988

[54] RADAR SYSTEM OPERATING IN TWO FREQUENCY BANDS

[75] Inventor: Bernard Gellekink, Ootmarsum, Netherlands

[73] Assignee: Hollandse Signaalapparaten B.V., Hengelo, Netherlands

[21] Appl. No.: 860,945

[22] Filed: May 5, 1986

[30] Foreign Application Priority Data

May 23, 1985 [NL] Netherlands ............... 8501469

[51] Int. Cl.$^4$ ................. G01S 13/42; G01S 13/72
[52] U.S. Cl. ........................... 342/59; 342/80; 342/95
[58] Field of Search ............ 342/59, 61, 73–77, 342/80, 93, 94–97, 148, 195

[56] References Cited

U.S. PATENT DOCUMENTS

| | | | |
|---|---|---|---|
| 3,603,995 | 9/1971 | Howard | 342/80 |
| 3,713,154 | 1/1973 | Kummer | 342/148 X |
| 3,795,913 | 3/1974 | Kosowsky et al. | 342/148 X |
| 3,827,049 | 7/1974 | Van Staaden et al. | 342/59 |
| 4,041,487 | 8/1977 | Evans et al. | 342/148 X |
| 4,090,197 | 5/1978 | Cantrell | 342/148 |
| 4,110,752 | 8/1978 | Neri | 342/77 |
| 4,163,975 | 8/1979 | Guilhem et al. | 342/94 |
| 4,319,242 | 3/1982 | Lewis | 342/67 |
| 4,449,127 | 5/1984 | Sanchez | 342/148 X |

FOREIGN PATENT DOCUMENTS

| | | | |
|---|---|---|---|
| 0087355 | 8/1983 | European Pat. Off. | 342/148 |
| 2261741 | 7/1973 | Fed. Rep. of Germany | 342/75 |
| 0181078 | 4/1985 | Japan . | |

OTHER PUBLICATIONS

Cross et al., "Trakx: A Dual-Frequency Tracking Radar"; Microwave Journal, (9/76, pp. 39–41).
Stiefvater, "Low Angle Tracking Technique"; Agard Conf. Proc.s No. 197; 6/76.

Primary Examiner—Theodore M. Blum
Assistant Examiner—Bernarr E. Gregory
Attorney, Agent, or Firm—Robert J. Kraus

[57] ABSTRACT

A radar system for low-level target tracking comprises a first and a second radar apparatus, both apparatus operating at their own frequency, but employing one and the same tracking antenna. A target being tracked in range and angle coordinates by the first radar apparatus can be tracked in angle coordinates by the second apparatus and in range by the first radar apparatus when the target arrives within the range of the second radar apparatus. A preferred digital embodiment of this system is obtained by utilizing a common signal processing unit including a matched filter.

4 Claims, 2 Drawing Sheets

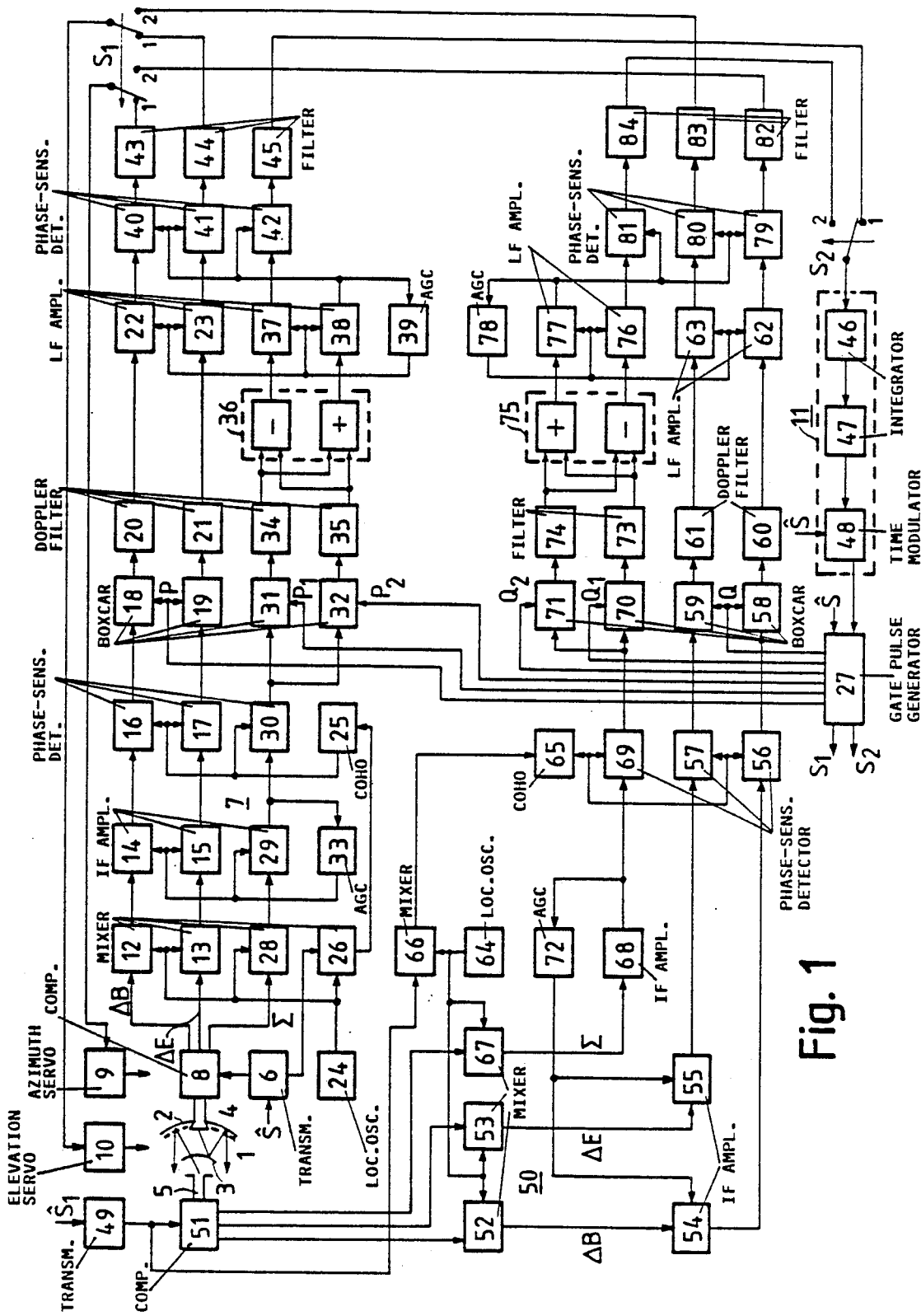

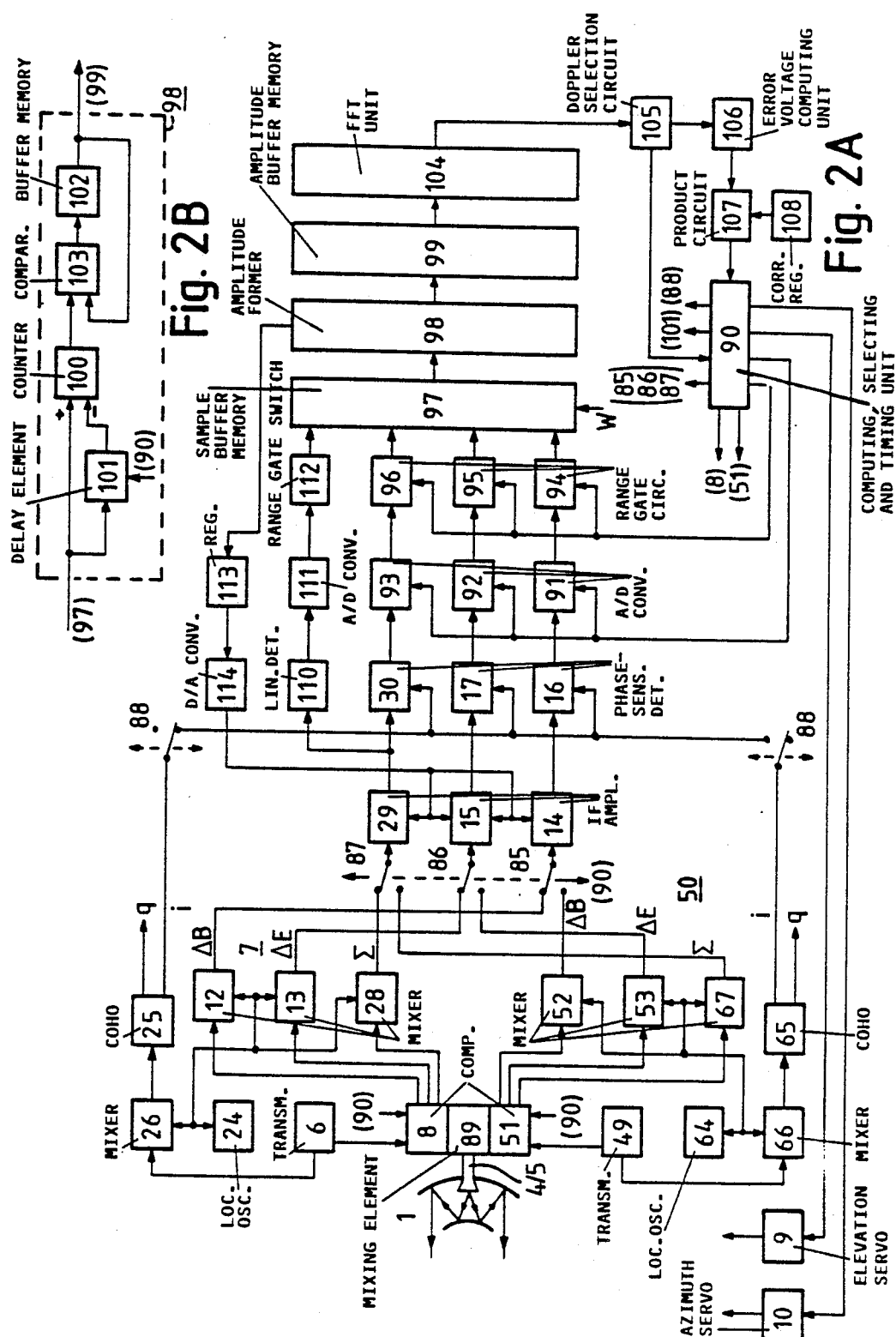

RADAR SYSTEM OPERATING IN TWO FREQUENCY BANDS

BACKGROUND OF THE INVENTION

The invention relates to a radar system for the automatic tracking of targets, in particular targets which are relatively low altitude.

With a target at a designated range and azimuth, but still unknown elevation, such a radar system is aligned with the indicated range and azimuth during acquisition, whereupon the tracking antenna performs a motion in elevation. At the moment the tracking antenna acquires the target, the three-dimensional position (range, azimuth and elevation) of the target is known, so that the actual tracking phase of the radar system can be started. Since the target may change its position rapidly during the acquisition phase and, hence, the range and the azimuth may be subject to change during this phase, it is advisable to select a sufficiently wide range gate and beam width to prevent loss of the target during the elevation scan of the tracking antenna. Moreover, a not too narrow beam is of importance when an operational radar system is moved clear over a hilly terrain, while processing tilted positions as efficiently as possible.

Once the radar system has detected the target and has thus assumed the tracking phase, electronic readjustment of the range gate for a smaller value is a simple matter to obtain a better signal/noise ratio; however, it is not possible to reduce the beam width, as the antenna size is a fixed parameter. It is therefore necessary to continue tracking of the target with a too wide a beam width; this does not usually present any insuperable problems.

Should the target however retain a relatively low altitude, in particular with a relatively large target range, there is the problem that, due to reflection of a part of the echo signals against the earth surface, the tracking antenna just because of its excessively wide beam receives, in addition to the echo energy derived directly from the target being tracked, echo energy derived from the target but reflected by the earth surface. The result is that the reflected radiation pattern will be disturbed, and may impede the accurate tracking of the target. In other words, the advantage gained with a rather wide antenna beam in the acquisition phase changes into a disadvantage in the tracking phase, in particular with the tracking of a low-flying target at short range when it is desired to have a reasonably narrow antenna beam. Since larger dimensions of an antenna result in a narrower antenna beam, a solution for the above conflicting requirements is obtainable with a phased-array antenna according to the state of the art: in the acquisition phase of a given target the more centrally located antenna elements are utilised through a suitably selected amplitude and phase control of these elements, resulting in a rather wide antenna beam. On the other hand, in the tracking phase in respect of low flying targets, all antenna elements are involved to form the antenna beam through a change in the amplitude and phase control of these elements, resulting in a rather narrow antenna beam.

Such a solution is however inapplicable to a tracking antenna with a parabolic reflector of fixed dimensions. In such a case, the above-mentioned problems can be solved by making use of a reflector area of maximum dimensions for a tracking antenna with a suitably selected frequency to provide a rather narrow radar beam and, hence, less disturbance of the reflected radiation pattern. This is however possible only if during the elevation scan of the tracking antenna the probability of losing the target is minimized in the acquisition phase; therefore, it is imperative that the range and azimuth values of the target are continuously determined by the search radar as well as possible and that these values are employed optimally to align the tracking radar during acquisition. As concerns the determination of a highly accurate azimuth value of the target by the search radar, it is important to select the maximum dimensions of a search antenna.

Such a solution to the problem has however the disadvantage that the tracking antenna and the search antenna to be used are highly vulnerable due to the dimensions during bombardments, and during transport of the radar system, while operating, on a vehicle under extreme terrain conditions (e.g. a forested area).

According to the state of the art, another solution to the indicated problem of minimizing the probability of losing the designated target during acquisition is realizable with the tracking antenna performing a so called T.V. scan over a certain azimuthal sector in ascending direction. Such a solution however is successful only for slowly moving targets.

SUMMARY OF THE INVENTION

It is an object of the present invention to provide a solution to the indicated problems and thus provide a radar system for acquiring targets at large ranges, while tracking targets at both long and short ranges, also in situations where considerable reflections of the echo energy against the earth surface are incurred.

According to the invention, the radar system of the type cited in the opening paragraph comprises a first radar apparatus for tracking targets in range and angle coordinates and a second radar apparatus for tracking the targets at least in angle coordinates, which radar apparatus, each operating at its own frequency, utilize one and the same antenna. The two frequencies, at least when tracking a low-flying target, are characteristic for the receipt of echo signals from different ranges within which ranges, in the event a target is at a relatively low altitude, the relevant radar apparatus produces a reliable angle error voltage, whereto the frequency of the second radar apparatus is of such a high value that the disturbance due to the receipt of target echoes reflected by the earth surface has no influence on the antenna tracking motion, and whereby in a first mode of operation in which a target being tracked is outside the range of the second radar apparatus, the target is tracked in range and angle coordinates by the first radar apparatus, whereto the first radar apparatus is provided with a range gate circuit, a range tracking unit controlling the opening of the range gate circuit, and with an angle tracking unit that supplies angle error voltages for the alignment of the antenna, while in a second mode of operation assumed when the target being tracked by the first radar apparatus arrives within the range of the second radar apparatus, the target can be tracked in angle coordinates by the second radar apparatus and in range by the first radar apparatus, whereto the second radar apparatus is also provided with an angle tracking unit that supplies the error voltages for the alignment of the antenna, and a range gate circuit which is, however, controllable by the range tracking unit of the first radar apparatus, which radar system further comprises switching means with the aid of which means the error voltages supplied by the angle tracking unit of the first or the second radar apparatus are fed to the antenna servos used for the angle tracking movement, whereto said switching means is controlled by at least a control signal derived from the second radar apparatus when the target being tracked is within its detection range.

BRIEF DESCRIPTION OF THE DRAWINGS

The invention will further be described with reference to the accompanying drawings figures, in which:

FIG. 1 illustrates a first feasible embodiment of a radar system according to the invention, and FIGS. 2A-2B illustrate a second feasible embodiment of the radar system.

DESCRIPTION OF THE PREFERRED EMBODIMENT

FIG. 1 shows the tracking antenna 1 of a radar system. It is known that with the tracking of a target flying at a low altitude the beam of tracking antenna 1 also illuminates a part of the earth surface, so that tracking antenna 1 receives, in addition to echoes derived directly from the target, target echoes reflected by the earth's surface. The latter echoes seem to originate from a fictitious target, which is the image of the target being tracked with respect to the earth's reflecting surface. The target and the fictitious target may in turn be conceived to be radiating sources, of which the generated wavefront encountering the tracking antenna will seem to originate in general from a direction other than that of the target being tracked. The tracking antenna 1 will then no longer be directed to the target being tracked, but—depending on the incurred phase jumps in the wavefront—will align itself at an elevation that is either too small or too large. The angular error thus arising is inversely proportional to the range of the target being tracked, provided the target flying at a low altitude has not approached the antenna 1 too closely; for very short ranges the elevation angle of the radar beam increases as the target approaches the antenna 1, thereby reducing the image effect and hence the angular error. In fact, within a certain range no image effect will occur at all. With the use of a radar tracking apparatus operating at a wavelength of $\lambda = 3.2$ cm and a tracking antenna of limited dimensions, it is found that the accurate tracking of a low-flying target, that is in angle coordinates, is impossible if this target is at a range of about 5 km from the antenna. If the wavelength used is decreased by a factor 4, i.e. $\lambda = 8$ mm, the angular error, caused by the image effect due to the earth surface, is strongly reduced through the choice of a smaller wavelength. The range of a radar tracking apparatus, operating at a wavelength of 8 mm, is highly limited in comparison with a radar tracking apparatus operating at 3.2 cm. Hence, the use of such a tracking apparatus as an independent unit serves little purpose.

There will now be described a radar tracking system embodying the invention that enables the acquisition of specified targets and the tracking of targets at a relatively long range using a relatively wide beam, and also the accurate tracking of targets at low altitude and at relatively short range. Such a radar system, according to the invention, comprises a first radar apparatus for the tracking of targets in range and angle coordinates, and a second radar apparatus for the tracking of the targets at least in angle coordinates, which radar apparatus, both operating at their own wavelength, for example 3.2 cm and 8 mm, respectively, make use of one and the same tracking antenna. The two wavelengths, at least with the tracking of a low-flying target, are characteristic for the receipt of echo signals from different ranges, within which ranges the particular radar apparatus produces a reliable angle error voltage in the event a target being tracked is at a relatively low altitude, whereby the frequency of the second radar apparatus is of such a high value that the interference caused by the receipt of target echoes reflected by the earth's surface has no influence on the antenna tracking movement.

According to the invention, the radar system may assume two modes of operation. In a first mode in which a target being tracked is outside the range of the second radar apparatus, the target is tracked in range and angle coordinates by the first radar apparatus; to this end the first radar apparatus is provided with range gate circuitry, a range tracking unit controlling the opening of the range gate circuitry, and an angle tracking unit that supplies the error voltages for the alignment of the antenna with the target being tracked. In a second mode, assumed when the target being tracked by the first radar apparatus arrives within the range of the second radar apparatus, the target can be tracked in angle coordinates by the second radar apparatus and in range by the first radar apparatus. To this end, the second radar apparatus is also provided with an angle tracking unit that supplies the error voltages for the alignment of the antenna, and a range gate circuit which is, however, controllable by the range tracking unit of the first radar apparatus.

The radar system further comprises first switching means with the aid of which the error voltages supplied by the angle tracking unit of the first or the second radar apparatus are fed to the antenna servos used for the angle tracking movement; to this end the first switching means is controlled by at least a control signal derived from the second radar apparatus to indicate that the target being tracked is within its range of detection.

If the target being tracked by the 3.2 cm radar apparatus arrives within the range of the 8 mm radar tracking apparatus and the system thus changes into the second mode, the target can be tracked in angle coordinates by the 8 mm radar apparatus and in range by the 3.2 cm radar apparatus. However, the latter is not necessary; the range tracking may also be performed by the 8 mm radar apparatus.

Although any combination of existing pulse radar apparatus is applicable to meet the above objective, in the embodiment illustrated by the block diagram of this figure both the 3.2 cm and the 8 mm radar apparatus are constituted by a separate monopulse radar apparatus. In selecting these radar apparatus, due account must be paid to the fact that the two radar tracking apparatus make use of one and the same tracking antenna.

In the illustrated embodiment the radar system uses a polarization-rotating Cassegrain antenna, of which the main reflector 2 is a parabolic twist reflector and the subreflector 3 a hyperbolic horizontal grid (transreflector). The feedhorn 4 of the 3.2 cm monopulse radar apparatus is situated at the zenith of the parabolic reflector 2, which is also a first focus of the subreflector. The horizontally polarized radiation emitted by feedhorn 4 illuminates, after reflection by the subreflector 3, the twist reflector 2 which rotates the polarization plane of the reflected radiation through 90°; this radiation is not affected by the subreflector 3, preventing subreflector 3 from influencing the radiation pattern adversely. The radiator 5 of the 8 mm radar apparatus is situated at the focus of the twist reflector 2. The vertically polarized radiation emitted by radiator 5 passes the subreflector 3 undisturbed and, due to the fact that its wavelength is precisely 4 times as small as that of the 3.2 cm monopulse radar apparatus, is not subjected to polarization shift. It is also possible to integrate the two feedhorns 4 and 5; in such a case, the integrated feedhorn may be situated in the zenith of the main reflector 2, while the main and subreflectors are of the conventional parabolic and hyperbolic design, respectively.

The 3.2 cm monopulse radar apparatus is of the type based on the sum and difference method, with which type a moving target can be tracked in two angle coordinates and in range. The radar apparatus comprises a transmitter 6 and a receiver 7. The transmitter pulses generated in transmitter 6 are fed to the feedhorn 4 of the Cassegrain antenna via a comparator 8, and then emitted in synchronism with the synchronization pulses S supplied by a synchronization pulse generator not shown in the figure. As is customary with such a monopulse radar apparatus, the energy resulting from a target echo and received from antenna 1 in the four sections of the feedhorn 4 is divided and converted into an elevation difference signal $\Delta E$, an azimuth difference signal $\Delta B$ and a sum signal $\Sigma$ with the aid of comparator 8.

The above sum and difference signals contain amplitude and phase information which is a measure of the magnitude and direction of the target deviation with respect to the radar symmetry axis. This signals can thus be used for the generation of error voltages required for the control of an azimuth servo 9, an elevation servo 10 and a range servo 11, respectively. With the aid of these servo the target is tracked in azimuth, elevation and range. The above difference and sum signals $\Delta B$, $\Delta E$ and $\Sigma$ are fed to the receiver 7, in which they are processed in separate channels. The comparator 8 also comprises an r.f. transmit and receive switch in the $\Sigma$ channel and a protective element in each of the difference channels $\Delta E$ and $\Delta B$. The function of the protective element includes the protection of the particular channel against reflections, which are obtained from the transmitter signal and could be coupled in the $\Delta E$ and $\Delta B$ channels via comparator 8.

The two receiver channels, one processing the $\Delta B$ signal and the other the $\Delta E$ signal, comprise respectively mixers 12 and 13, intermediate-frequency amplifiers 14 and 15, phase-sensitive detectors 16 and 17, boxcar circuits 18 and 19, doppler filters 20 and 21, and low-frequency amplifiers 22 and 23.

Since these two receiver channels are identical, the operation of the receiver channel processing the $\Delta B$ signal will be described only. In the mixer 12 the high-frequency $\Delta B$ signal is converted into an intermediate-frequency signal through a local oscillator 24. The amplification in the intermediate-frequency amplifier 14 is followed by the coherent detection of the intermediate-frequency signal $\Delta B_{IF}$ in the phase-sensitive detector 16 by a coherent oscillator (COHO) 25. If transmitter 6 consists of an r.f. oscillator (e.g. a magnetron) that is operating only for the duration of a transmitter pulse, this implies that the phase of the signal derived therefrom is distributed practically at random with respect to the output signal of local oscillator 24. To maintain phase coherence of the received echoes, these two signals are fed to a mixer 26. The output signal of this mixer is fed to the passive oscillator 25, such that this oscillator is locked to the same phase. The signal delivered by the COHO 25 is then a replica of the transmitter frequency, transformed however to the intermediate frequency. In this way it is achieved that the echo of an ideal fixed target at intermediate-frequency level has invariably the same relationship with respect to the COHO signal, so that after mixing in the phase-sensitive detector 16 a pulse of constant amplitude is obtained. For a moving target the phase relationship and hence the amplitude vary as the doppler frequency shifts. Other types of control circuits, used to obtain the desired phase relationship between the transmitter pulse, the local oscillator signal and the COHO signal, are known from U.S. Pat. No. 4,394,659.

The circuit following the phase-sensitive detector 16, i.e. boxcar 18, has two functions. Firstly, a range selection occurs here, that is, only the echo pulses which fall within a range gate P determined by a gate pulse generator 27 are passed through. Secondly, the pulses are stretched in such a way that a stepped signal is obtained at the output of the boxcar. This stepped signal is applied to doppler filter 20 and subsequently to l.f. amplifier 22, which delivers an output signal whose amplitude is a measure of the angular error in azimuth.

The $\Sigma$ channel comprises the r.f. transmit and receive switch (in comparator 8), a mixer 28, an intermediate-frequency amplifier 29, a phase-sensitive detector 30, and two boxcar detectors 31 and 32, for processing the high-frequency $\Sigma$ signal in the same way as described for the $\Delta B$ signal, so that, in this case too, after phase detection a pulse of constant amplitude is obtained for echoes from fixed targets, while this amplitude for echoes of a moving target varies as the doppler frequency $f_d$.

In order to eliminate the fluctuations due to changes of the target range and/or the total target cross section, the receiver comprises an AGC circuit 33 connected to the output of the intermediate-frequency amplifier 29 for setting the gain of the intermediate-frequency amplifiers 14, 15 and 29.

The output signal of the phase-sensitive detector 30 is fed to the two boxcars 31 and 32, each receiving a different range selection gate $P_1$ and $P_2$, respectively, where the trailing edge of range selection gate $P_1$ coincides with the leading edge of range selection gate $P_2$. The total duration of the two gates $P_1$ and $P_2$ corresponds with the duration of the range gate P supplied to boxcar detectors 18 and 19. Each of the output signals of the two boxcars 31 and 32 are now fed to a sum and difference circuit 36 via doppler filters 34 and 35, respectively, the difference output and the sum output being each connected to a low-frequency amplifier 37 and 38, respectively. The amplitude of the output signal of low-frequency amplifier 37 is a measure for the range error. The doppler filters 20, 21, 34 and 35 may be of either analog or digital design.

The output signals of the low-frequency amplifiers 22, 23 and 37, collectively form a first output signal of the receiver, while the sum signal at the output of low-frequency amplifier 38 forms a second output signal of the receiver. In spite of the fact that at I.F. level an automatic gain control is applied on the basis of the absolute value of the $\Sigma$ signal at the input of detector 30, the low frequency $\Sigma$ signal is not constant; an attenuation occurs if the echo of the target being tracked coincides with the relatively strong echo of a fixed target, since the i.f. AGC keeps the sum constant. In order to obviate this, the amplification in the l.f. amplifier stages is determined by an AGC circuit 39 (l.f. AGC), keeping the output signal of Σ amplifier 38 constant on the basis of the average value; this output signal is applied at the same time to the remaining l.f. amplifiers 22, 23 and 37.

Since each of the two first output signals of the receiver consists of an AC voltage, each of these signals (representative of the angular and range errors) is compared with the output signal of l.f. amplifier 38 in phase-sensitive detectors 40, 41 and 42, respectively, in order to determine the signs of the errors. The output signals of detectors 40 and 41 are then fed, via filters 43 and 44, to servos 9 and 10, respectively, for the alignment of the antenna in azimuth and elevation, respectively. The output signal of detector 42 is supplied, via filter 45, to range servo 11. This servo consists of the cascade connection of two integrators 46 and 47 and a time modulator 48. The latter is started by each synchronisation pulse $\hat{S}$ to deliver an output pulse after a period that varies as the output voltage of integrator 47. This output pulse is supplied to gate pulse generator 27 for determining the presence of the range gate (P) produced by the generator and range selection gates $P_1$ and $P_2$.

The 8 mm radar apparatus is of the same type as the 3.2 cm radar apparatus and comprises a transmitter 49 and a receiver 50. The electromagnetic energy generated in transmitter 49 is fed, via a comparator 51, to the feedhorn 5 of the aforementioned Cassegrain antenna to emit this energy in synchronism with the synchronization pulses $\hat{S}_1$ delivered by the afore-mentioned synchronization pulse generator not shown in the figure. The $\hat{S}_1$ synchronization pulses are delayed with respect to the $\hat{S}$ synchronisation pulses supplied to transmitter 6 of the 3.2 cm monopulse radar apparatus.

The echo energy received from the four sections of feedhorn 5 is divided with the aid of comparator 51 to obtain an elevation difference signal $\Delta E$, an azimuth difference signal $\Delta B$ and a sum signal $\Sigma$. These signals are processed in separate channels in receiver 50. The receiver channels processing the $\Delta B$ and the $\Delta E$ signals are identical and comprise respectively mixers 52 and 53, intermediate-frequency amplifiers 54 and 55, phase-sensitive detectors 56 and 57, boxcars 58 and 59, doppler filters 60 and 61, and low-frequency amplifiers 62 and 63. Mixers 52 and 53 convert the high-frequency difference signals $\Delta B$ and $\Delta E$, respectively, into intermediate-frequency signals with the aid of the output signal of local oscillator 64. After amplification in amplifiers 54 and 55, coherent detection of these intermediate frequency signals occurs in phase-sensitive detectors 56 and 57, respectively, using the output signal of COHO 65. This COHO is a passive oscillator driven by the output signal of mixer 66 fed by transmitter 49 and local oscillator 64.

The video signals obtained are fed to the relevant boxcar detectors 58 and 59, fed with a range gate Q. The output signals of the two boxcar detectors 58 and 59 are supplied to l.f. amplifiers 62 and 63, respectively, to deliver an output signal whose amplitude is a measure for the angular error in azimuth and elevation, respectively.

The Σ channel comprises the r.f. transmit and receive switch in comparator 51, a mixer 67, an i.f. amplifier 68, a phase-sensitive detector 69, and two boxcar detectors 70 and 71. As applicable to the angle/receiver channels $\Delta B$ and $\Delta E$, the signal received in the Σ channel is processed, so that the amplitude of the output signal of the phase-sensitive detector 69 varies as the target doppler frequency $f_d$ with the detection of a moving target.

The output signal of i.f. amplifier 68 is also applied to an AGC circuit 72 to obtain a reference signal with respect to the gain factors of amplifiers 54, 55 and 68.

The two boxcar detectors 70 and 71 receive different range selection gates $Q_1$ and $Q_2$, the trailing edge of range selection gate $Q_1$ coinciding with the leading edge of range selection gate $Q_2$ and the total duration of the two range selection gates $Q_1$ and $Q_2$ corresponding with that of range gate Q. After filtering in filters 73 and 74, the output signals of the two boxcar detectors 70 and 71 are supplied to a sum and difference circuit 75, of which the difference output and the sum output are connected to low-frequency amplifiers 76 and 77, respectively. The amplitude of the output signal of low-frequency amplifier 76 is a measure of the range error. The use of this signal for the tracking of targets in range, when the 8 mm radar apparatus does not have a separate range tracking unit, will be described hereinafter.

The receiver 50 further comprises an AGC circuit fed by amplifier 77 to keep the d.c. voltage level at the output of low-frequency amplifiers 62, 63, 76 and 77 constant. In phase-sensitive detectors 79, 80 and 81 the output signals of l.f. amplifiers 62, 63 and 76 are compared with the output signal of l.f. amplifier 77 to determine the signal of the angular errors and range error indicated by these signals. The output signals of detectors 79, 80 and 81 are then applied to filters 82, 83 and 84.

The radar system according to the invention comprises a switch $S_1$ with the aid of which either the angular error voltages of filters 82 and 83 or those of filters 43 and 44 can be fed to servos 9 and 10, respectively. Furthermore, a switch $S_2$ is provided to incorporate the range servo 11 of the 3.2 cm monopulse radar tracking apparatus in the 8 mm monopulse radar tracking apparatus.

If the system is in the first mode of operation, i.e. the target being tracked is outside the range of the 8 mm monopulse radar apparatus, the target is tracked in azimuth, elevation and range by the 3.2 cm monopulse radar apparatus. In such a case, switches $S_1$ and $S_2$ are in position 1 as indicated in the figure.

As soon as the target is within the range of the 8 mm monopulse radar apparatus, and thus either the range tracking gate P is generated by the gate pulse generator 27 within a certain period after the transmitter pulse, or the echo signal has exceeded a certain threshold, the 8 mm monopulse radar apparatus has to take over the angular tracking movement; this is however possible only if range selection gate $Q_1$ and $Q_2$ have already been aligned with the target. This is achieved, because the gate pulse generator 27 of the 3.2 cm monopulse radar apparatus also determines the tracking gates for the 8 mm monopulse radar apparatus, provided however the range selection gates $Q_1$ and $Q_2$ are subjected to a delay with respect to gates $P_1$ and $P_2$ of the monopulse radar apparatus, which delay corresponds with the delay between synchronization pulses $\hat{S}$ and $\hat{S}_1$. This delay is realized in gate pulse generator 27. In this way, the range gate of the 8 mm monopulse radar apparatus constantly follows the range gate of the 3.2 cm monopulse radar apparatus, and the radar system can simply be switched to the second mode if the target has come within the range of the 8 mm monopulse radar apparatus. Since in this process the angle tracking movement is effected by the 8 mm monopulse radar apparatus, a control signal ($S_1$) from the gate pulse generator 27 or from the sum output of unit 75 must set switch $S_1$ to position 2, not shown in the figure.

If it is desired to track the target in range by the 8 mm monopulse radar apparatus, switch $S_2$ must be set to position 2, not shown in the figure, to supply the output signal of filter unit 84, which signal is a measure for the range error, to the range servo 11 This servo controls the gate pulse generator 27, which feeds the delayed range gate Q and the range selection gates $Q_1$ and $Q_2$ to boxcar detectors 58, 59, 70 and 71, respectively. Also in this situation, the introduced delay is essential, as the time modulator 48 of the range servo 11 responds to the synchronization pulses S of the 3.2 cm monopulse radar apparatus, while the 8 mm monopulse radar apparatus is performing the range tracking.

It is however possible to obtain a more compact and particularly favorable embodiment of the above-described radar system with the application of digital processing of the signals to yield surprisingly good results.

An embodiment of a radar system based on these principles is shown in FIG. 2 and comprises two radar tracking apparatus of the monopulse type, which also include a 3.2 cm radar apparatus and an 8 mm radar apparatus for the sake of clarity. In this embodiment as well, the two radar apparatus employ one and the same tracking antenna.

The radar system of FIG. 2 corresponds in part with the radar system of FIG. 1. Thus the 3.2 cm radar apparatus comprises a transmitter 6 and a receiver 7, whereby the separate receiver channels ($\Delta B$, $\Delta E$ and $\Sigma$ channels) connected to the integrated feedhorn (4/5) of tracking antenna 1 via comparator 8 are provided with respective mixers 12, 13 and 28, controlled by local oscillator 24. The remaining part of the receiver channels ($\Delta B$, $\Delta E$ and $\Sigma$ channels) can be designed to advantage as a common video processing part for the 3.2 cm and the 8 mm monopulse radar apparatus. Consequently the common part comprises switching means 85, 86 and 87, i.f. amplifiers 14, 15 and 29, and phase-sensitive detectors 16, 17 and 30, controlled by COHO 25 via a switching unit 88 in the position indicated in the figure, provided it concerns an echo signal obtained through a 3.2 cm transmitter signal. COHO 25 is set by the output signal of mixer 26 connected to local oscillator 24 and transmitter 6. As already remarked, other types of control circuits are possible to obtain the desired phase relationship between the transmitter pulse, the local oscillator signal and the COHO signal.

Similarly, the 8 mm radar apparatus in FIG. 2 comprises a transmitter 49 and a receiver 50, whereby the transmitter energy from comparator 51 and that from comparator 8 are supplied to the integrated feedhorn 4/5 via a mixing element 89 of a known type. Passing through the comparator 51 connected to the integrated feedhorn 4/5 and mixing element 89, the echo energy is divided over the separate receiver channels ($\Delta B$, $\Delta E$, $\Sigma$ channels), containing respectively mixers 52, 53 and 67 controlled by a local oscillator 64. Switching means 85, 86 and 87 connect these mixers to the common part, whereby the phase-sensitive detectors 16, 17 and 30, respectively, are controlled by COHO 65 via switching unit 88 (in the position not indicated in the figure, provided it concerns an echo signal obtained through an 8 mm transmitter signal). COHO 65 is controlled by the output signal of a mixer 66 fed by local oscillator 64 and transmitter 49.

To avoid simultaneous reception of two echo signals related to the same target in consequence of a 3.2 cm and an 8 mm transmitter pulse, the synchronization signals S and $S_1$ for transmitters 6 and 49, respectively, are not generated at the same time. With the same time interval as between the 3.2 cm and the 8 mm transmitter pulses the respective echo signals appear in succession at the phase-sensitive detectors 16, 17 and 30; this permits changing of the position of the switching unit 88. Thus each of the echo signals obtained from the same target but from different transmitter pulses (3.2 cm and 8 mm) are phase-detected by the corresponding COHO signal.

The position of switching unit 88 is changed with the aid of a computing, selecting and timing unit 90, which also determines the generation time of synchronization pulses S and $S_1$. The signal processing from the phase-sensitive detectors is performed on a quadrature basis, implying that the signal from the i.f. amplifiers is phase-detected by the in-phase COHO signal (i), as well as with the quadrature COHO signal (q). Since further processing of the signals phase-detected by these COHO signals (i and q) is fully identical, only the processing of the signal detected by the in-phase COHO signal will be described. The signal processing with respect to the output signals of the phase-sensitive detectors 16, 17 and 30 is performed digitally.

It is possible to sample each of these output signals over the full pulse duration in the conventional way in a boxcar detector and to digitize the sampled signal, whereupon the FFT processing of the digitized signal can be performed in batches. If however, the 3.2 cm and the 8 mm transmitter signals differ too widely in pulse width and hence the difference between the bandwidths is too great, in view of the signal/noise ratio, it is not advisable to proceed from a uniform sampling period in the boxcar detector. In view of the signal/noise ratio, a special and highly favorable method of sampling and digitizing the phase-detected echo signals is obtained by providing each receiver channel ($\Delta B$, $\Delta E$ and $\Sigma$) of the radar system with analog/digital converters 91, 92 and 93, respectively, range gate circuits 94, 95 and 96, a sample buffer memory 97, an amplitude former 98, and an amplitude buffer memory 99. In this embodiment however the analog/digital converters 91, 92 and 93 are of the type that takes samples of the applied signal at a very high rate and digitizes each of the sampled values. The rate at which these converters are active is so high that the duration $\Delta T$ between two successive sampling times is a few times smaller than the pulse duration of the phase-detected echo signal.

The operation of the analog/digital converters 91, 92 and 93 is uninterrupted during the full listening time, so that of all the sampled (and digitized) signal values only a small portion, namely that of the target echo signal (both from the 3.2 cm and the 8 mm receivers), is usable. Hence, range gate circuits 94, 95 and 96, controlled by the computing, selecting and timing unit 90, are made to conduct only during the periods in which the sampled values of the echo signal (both for the 3.2 cm and the 8 mm wavelengths) are expected. The passed sampled values are stored in the sample buffer memory 97, whereupon for the sampled values obtained with the 3.2 cm echo signal and for the sampled values obtained with the 8 mm echo signal, the maximum sum value of sampled signals is determined out of at time interval (T), where the duration T of this time interval substantially corresponds with the width of the relevant transmitter pulse.

Such an amplitude former 98, as shown in FIG. 2B, may be conceived to consist of a counter 100 for counting a supplied sampled signal value and the same value is deducted from the then obtained sum value, using a delay element 101. Next the actual sum value of counter 100 and a value stored in a buffer memory 102 is continuously supplied to a comparator 103; from the values so supplied the comparator 103 determines the maximum value to be applied to buffer memory 102 to overwrite the value stored therein. In the event a rectangular video signal is sampled, the consecutively supplied sample values will approximate a triangular pattern of the sum value, where the top value of this pattern corresponds with the average amplitude of the phase-detected echo signal.

For a pulse-shaped rectangular signal (thus having a (sin x)/x frequency characteristic) a filter matched to this signal should also have a (sin x)/s frequency characteristic to result in an output signal with a $(\sin^2 x)/x^2$ frequency characteristic, which in turn is characteristic of a signal of a triangular waveform. Therefore, the combination of the series-connected analog/digital converter, the range gate circuit, the sample buffer memory and the amplitude former for rectangular pulse-shaped input signals can be regarded as a matched filter, having important advantages, such as an optimal bandwidth and a maximum signal/noise ratio, both for the phase-detected echo signal having a 3.2 cm wavelength and for that having an 8 mm wavelength. Since the delay time introduced by delay element 101 has to be dependent upon the pulse width of the transmitter pulse relating to the particular video pulse, the delay in element 101 is set with the aid of unit 90. The number (n) of samples so contributing in the amplitude former to the maximum sum value approximates the quotient $T/\Delta T$, where T is the particular pulse duration and $\Delta T$ the sampling time. The video amplitudes produced by the matched filter within a range gate, the so-called phase error indication values $\Delta E$ and $\Delta B$ and the sum value $\Sigma$, are stored in the amplitude buffer memory 99.

Further the amplitude former 98 determines the sum value of the signal samples obtained in the first part of the range gate and reduces these samples by the signal samples obtained in the second part of the range gate. This occurs for the signal samples based on both the 3.2 cm and 8 mm wavelengths, resulting for each of the above cases in a range error indication value $\Delta r$, which is a measure of the range error of the tracking gate. Like the other signal values ($\Delta B$, $\Delta E$, $\Sigma$), the $\Delta r$ values are stored in the amplitude buffer memory 99. Subsequently, in the Fast Fourier Transformation unit 104 a number of successive signal values obtained from the same receiver channel are processed in batches; this occurs jointly with the W-signal values, obtained in the same way after phase detection of the video information through the COHO signal q and supplied to the amplitude buffer memory 99 through the sample buffer memory 97 and amplitude former 98.

With an N-point Fast Fourier Transformation, N sampled signals of successive pulse repetition times of the same receiver channel are required for one result. The result is obtained by the values of the Fourier coefficients, which are produced for each of the N frequency intervals of the doppler filter range $(0, \frac{1}{2}f_r)$, where $f_r$ is the pulse repetition frequency. Each period of N pulse repetition times and each frequency interval l (where l = 1, 2, ..., N) of the doppler filter range, the Fourier coefficients $f(\Delta B)_l$, $f(\Delta E)_l$, $f(\Sigma)_l$ and $f(\Delta r)_l$ are produced. For the frequency interval with the maximum value for $f(\Sigma)_l$ a doppler selection circuit 105 then selects the corresponding values of the Fourier coefficients. These coefficients are here denoted by $f(\Delta B)_F$, $f(\Delta E)_F$, $f(\Sigma)_F$ and $f(\Delta r)_F$. From these four coefficients are error voltage computing unit 106 determines the quotients $$\frac{f(\Delta B)_F}{f(\Sigma)_F}, \frac{f(\Delta E)_F}{f(\Sigma)_F} \text{ and } \frac{f(\Delta r)_F}{f(\Sigma)_F}$$

in succession; these quotients are a measure of the angular errors in azimuth and elevation and of the range error.

To eliminate the phase errors introduced in the receiver channels, the obtained quotients may be adapted in a product circuit 107, using correction factors obtained by known means with the injection of pilot tones and stored in an error voltage correction register 108. It is of advantage to inject the pilot tones into the integrated feedhorn 4/5, to permit maximum compensation of the phase errors in the receiver channels in product circuit 107.

The servo voltages generated on the basis of the $$\frac{f(\Delta B)_F}{f(\Sigma)_F} \text{ and } \frac{f(\Delta E)_F}{f(\Sigma)_F}$$

quotients in the computing, selecting and timing unit 90 are suitable for supplying the azimuth and elevation servos 9 and 10, respectively, to track the target in azimuth and elevation.

Unit 90 also supplies clock pulses $\dot{R}$, needed for the sampling process in the analog/digital converters 91, 92 and 93. Upon the indication of the $$\frac{f(\Delta r)_F}{f(\Sigma)_F}$$

quotient the computing, selecting and timing unit 90 readjusts range gate P and the range selection gates $P_1$ and $P_2$ dividing range gate P, and checks whether the position of range gate P is within the range of the 8 mm monopulse radar apparatus and the $\Sigma$ value has exceeded a certain threshold. If this is so, the computing, selecting and timing unit 90 performs the switching function described with reference to FIG. 1, implying that the error voltages concerning the 8 mm radar are supplied to the angle servos 9 and 10.

If it is desired that the 8 mm monopulse radar apparatus also performs the tracking in range, this can be achieved simply by adjusting the range gate by unit 90 on the basis of the $$\frac{f(\Delta r)_F}{f(\Sigma)_F}$$

quotient from the 8 mm echo signal. It will be obvious that unit 90 is also suitable for the generation of synchronization signals $\hat{S}$ and $\hat{S}_1$.

The use of quadrature detection in receivers 7 and 50 requires that each of the phase-sensitive detectors 16, 17, 30, 56, 57 and 69 be available in duplicate to perform the phase detection of the supplied i.f. signal through both the output signal obtained directly from COHO 25 and 65, respectively, as well as through its quadrature output signal. This also implies a duplication of the analog/digital converters 91, 92, 93 and the range gate circuits 94, 95, 96, while the Fast Fourier Transformation unit 104 determines the modulus of the Fourier coefficients coupled in pairs in each receiver channel and for each frequency interval. From the modulus values the doppler selection circuit 105 makes the selection for the production of the above-described quotients in the computing, selecting and timing unit 90. The radar system further comprises an AGC circuit 109 for determining the gain factor of i.f. amplifiers 14, 15 and 29. The video processing part is thereto provided with a series circuit consisting of a linear detector 110, an A/D converter 111 and a range gate switch 112, which series circuit is supplied with the output of amplifier 29. Converter 111 and switch 112 are controlled by the computing, selecting and timing unit 90. Only the samples obtained from range gate switch 112 from the target echo are stored in the sample buffer memory 97. Amplitude former 98 determines the amplitude of the supplied values from a period of N successive echo signals, also involving the values obtained in the quadrature basis; from these values a control factor is derived for i.f. amplifiers 14, 15 and 29. This control factor is subsequently written in a register 113, enabling adjustment of the gain factor of i.f. amplifiers 14, 15 and 29 through a D/A converter 114 at any desired moment. The digital AGC circuit 109 now enables tracking of two or more separate targets present in the radar beam. For instance, with the presence of two targets in the radar beam, a first AGC factor stored in register 113 is used for the optimal setting of i.f. amplifiers 14, 15 and 29 during a first period to receive and process the echo signal from the nearer target. Subsequently, a second AGC factor stored in register 113 resets i.f. amplifiers 14, 15 and 29 optimally during a second period in the same pulse repetition time to receive and process the echo signal from the more distant target.

It is not necessary to commence the common video processing part at i.f. amplifiers 14, 15 and 29; the common processing part could also be inserted at other units in the signal processing part.

The possible embodiments of the radar system described before are not restricted by the use of the indicated wavelengths, i.c. 3.2 cm and 8 mm. Other combinations of wavelengths are also applicable provided the corresponding frequencies are of different frequency bands, preferably the X- and Ka-bands.

I claim:

1. A radar system capable of automatically tracking targets which are at sufficiently low altitudes to produce echoes which are reflected by the earth's surface, said radar system comprising:
   (a) an antenna system suitable for operating in first and second frequency bands, the first frequency band corresponding with longer wavelengths more suitable for angular tracking at longer ranges and the second frequency band corresponding with shorter wavelengths more suitable for angular tracking at shorter ranges;
   (b) means for controlling the direction of the antenna system to effect target tracking;
   (c) a first radar apparatus electrically coupled to the antenna system and operable in the first frequency band to effect angular tracking at the longer ranges, said first radar apparatus including a first receiver for producing signals representative of the ranges and directions of targets at the longer ranges;
   (d) a second radar apparatus electrically coupled to the antenna system and operable in the second frequency band to effect angular tracking at the shorter ranges, said second radar apparatus including a second receiver for producing signals representative of at least the directions of targets at the shorter ranges;
   (e) signal processing means for deriving, from the signals produced by the first radar apparatus, first antenna direction error signals for targets at the longer ranges and target range information;
   said signal processing means also deriving, from the signals produced by the second radar apparatus, second antenna direction error signals for targets at the shorter ranges; and
   (f) control means coupled to the first and second radar apparatus, to the signal processing means, and to the means for controlling the direction of the antenna;
   said control means effecting timing of pulse transmissions by the first and second radar apparatus, effecting alternate application of the signals from the first and second radar apparatus to the signal processing means, and effecting control of the antenna direction for longer and shorter range targets in response to the first and second antenna direction error signals, respectively.

2. A radar system as in claim 1 where the signal processing means comprises:
   (a) a plurality of phase sensitive detectors for alternatively phase detecting respective elevation difference signals, azimuth difference signals and sum signals produced by the first and second radar apparatus; and
   (b) a matched filter electrically connected to the phase sensitive detectors for deriving, from the phase-detected signals, phase error indication values, range-error-indication values, and sum signal values.

3. A radar system as in claim 2 where the matched filter comprises a group of series-connected elements including:
   (a) analog-to-digital converter circuitry electrically connected to the phase sensitive detectors for producing digitized signals;
   (b) range gate circuitry electrically connected to the analog-to-digital converter circuitry for selectively passing the digitized signals in response to signals from the control means;
   (c) a first buffer memory for storing the selected digital signals passed by the range gate circuitry; and
   (d) an amplitude former for determining the maximum sum signal value from such values corresponding to a pedetermined pulse transmitted by the respective radar apparatus from which said sum signals originated.

4. A radar system as in claim 3 where the amplitude former comprises:
   (a) counter means electrically connected to the first buffer memory for successively adding and then subtracting each of the sample signal values corresponding to the predetermined pulse;

(b) a second buffer memory for successively storing selected ones of the sum signal values in place of previously-stored sum signal values; and (c) a comparator having first and second inputs electrically connected to respective outputs of the counter means and the second buffer memory, and having an output electrically connected to an input of the second buffer memory, said comparator selecting for passage to the second buffer memory any sum signal value received from the counter means which is larger than the sum signal value currently stored in said second buffer memory.

* * * * *